US012732261B2

(12) United States Patent
Choi et al.

(10) Patent No.: US 12,732,261 B2
(45) Date of Patent: Sep. 8, 2026

(54) METHOD AND APPARATUS FOR EXTENDING COVERAGE AT THZ FREQUENCY USING COOPERATIVE COMMUNICATION

(71) Applicant: Korea Advanced Institute of Science and Technology, Daejeon (KR)

(72) Inventors: Junil Choi, Daejeon (KR); Hyesang Cho, Daejeon (KR); Beomsoo Ko, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 443 days.

(21) Appl. No.: 18/453,525

(22) Filed: Aug. 22, 2023

(65) Prior Publication Data

US 2024/0154686 A1 May 9, 2024

(30) Foreign Application Priority Data

Oct. 31, 2022 (KR) ........................ 10-2022-0141999

(51) Int. Cl.
*H04B 7/155* (2006.01)

(52) U.S. Cl.
CPC ..... *H04B 7/15514* (2013.01); *H04B 7/15592* (2013.01)

(58) Field of Classification Search
CPC ....................... H04B 7/15514; H04B 7/15592; H04B 7/026; H04B 7/15507; H04L 5/0007; H04L 5/0032
See application file for complete search history.

(56) References Cited

U.S. PATENT DOCUMENTS 7,853,204 B2 * 12/2010 Tan ...................... H04B 7/2606 455/13.1
8,478,189 B2 * 7/2013 Liu ...................... H04W 40/22 455/13.1
8,488,653 B2 * 7/2013 Miyatani ................ H04L 25/24 375/214
8,548,378 B2 * 10/2013 Kwon .................. H04W 36/30 455/13.1
8,792,367 B2 * 7/2014 Nie ...................... H04B 7/2606 370/252

(Continued)

OTHER PUBLICATIONS

Korean Office Action mailed Feb. 14, 2025, for Korean Application No. 10-2022-0141999, with machine generated English translation, 14 pages.

(Continued)

*Primary Examiner* — Dominic E Rego
(74) *Attorney, Agent, or Firm* — Lee & Hayes, P.C.

(57) ABSTRACT

Disclosed is a coverage extension method and apparatus in a terahertz (THz) region using cooperative communication. A coverage extension method in a THz region using cooperative communication performed by a computer device includes setting, by an access point (AP) in a downlink system that supports a plurality of user equipments (UEs), a UE that requires assistance due to a blocked line-of-sight (LoS) link as a destination UE and setting a remaining UE as a medium UE among the plurality of UEs; transmitting, by the AP, data to the medium UE; and cooperatively transmitting, by the medium UE, data to the destination UE.

17 Claims, 9 Drawing Sheets

(56) References Cited

U.S. PATENT DOCUMENTS 8,917,649 B2 * 12/2014 Sfar .................... H04B 7/0632 370/315
9,397,744 B2 * 7/2016 Chang ................ H04B 7/15521
9,532,296 B2 * 12/2016 Noh ...................... H04W 40/22
10,039,081 B2 * 7/2018 Zhang ................. H04W 68/005
10,993,120 B1 * 4/2021 Lekutai ................ H04B 7/0673
2002/0007238 A1 * 1/2002 Moriguchi ............. H04L 67/14 701/1
2002/0024935 A1 * 2/2002 Furukawa ............. H04B 7/155 370/349
2004/0032853 A1 * 2/2004 D'Amico .................. H04L 1/02 370/349
2009/0017752 A1 * 1/2009 Lee ..................... H04W 52/247 455/9
2009/0097433 A1 * 4/2009 Shen .................... H04B 7/2606 370/315
2009/0325622 A1 * 12/2009 Matsumura ....... H04W 52/0261 455/522
2010/0166098 A1 * 7/2010 Luz ...................... H04B 7/0689 375/267
2011/0212684 A1 * 9/2011 Nam ...................... H04B 7/022 455/7
2013/0303227 A1 * 11/2013 Liang ...................... H04W 4/08 455/519
2014/0171094 A1 * 6/2014 Noh ...................... H04W 40/22 455/452.1
2015/0172012 A1 * 6/2015 Abeysekera .......... H04L 5/0007 370/329
2016/0227518 A1 * 8/2016 Li ........................ H04W 76/14
2017/0134981 A1 * 5/2017 Duschl .................... H04L 45/22
2018/0213473 A1 * 7/2018 Oh ........................ H04W 76/23
2018/0302837 A1 * 10/2018 Serizawa .............. H04W 40/22
2019/0014506 A1 * 1/2019 Li ........................... H04W 4/70
2019/0014606 A1 * 1/2019 Li ......................... H04W 88/04
2019/0116627 A1 * 4/2019 Min ...................... H04W 64/00
2020/0344665 A1 * 10/2020 Liao ...................... H04W 72/02
2020/0344739 A1 * 10/2020 Rofougaran .......... H04L 5/0053
2021/0013960 A1 * 1/2021 Raghavan ............. H04W 88/04
2021/0250778 A1 * 8/2021 Tsutsui ................. H04B 7/0617
2021/0329728 A1 * 10/2021 Won ...................... H04W 76/25
2021/0344467 A1 * 11/2021 Hooli .................... H04L 5/0037
2022/0345983 A1 * 10/2022 Takeda .................. H04W 40/22
2023/0239815 A1 * 7/2023 Paz ....................... H04L 5/0053 370/503
2025/0158664 A1 * 5/2025 Makki .................. H04B 7/0695

OTHER PUBLICATIONS

Mao, Yijie, Bruno Clerckx, and Victor OK Li. "Rate-splitting multiple access for downlink communication systems: Bridging, generalizing, and outperforming SDMA and NOMA." EURASIP journal on wireless communications and networking 2018 (2018): 1-54.

Mir, Talha, Muhammad Waqas, Usama Mir, Syed Mudassir Hussain, Ahmet M. Elbir, and Shanshan Tu. "Hybrid precoding design for two-way relay-assisted terahertz massive MIMO systems." IEEE Access 8 (2020): 222660-222671.

Mao et al., "Max-min Fairness of K-user Cooperative Rate-Splitting in MISO Broadcast Channel with User Relaying," arXiv:1910.07843v2, Aug. 5, 2020, 14 pages.

* cited by examiner

FIG. 6

METHOD AND APPARATUS FOR EXTENDING COVERAGE AT THZ FREQUENCY USING COOPERATIVE COMMUNICATION

CROSS-REFERENCE TO RELATED APPLICATION

This application claims the priority benefit of Korean Patent Application No. 10-2022-0141999, filed on Oct. 31, 2022, in the Korean Intellectual Property Office, the disclosure of which is incorporated herein by reference.

BACKGROUND 1. Field of the Invention

The following example embodiments relate to a coverage extension method and apparatus in a terahertz (THz) region using cooperative communication and more particularly, to a coverage extension method and apparatus in a THz region using cooperative communication that may support electronic devices for which data supporting is absent using cooperative communication.

2. Description of the Related Art

Many candidates are being discussed to support sixth-generation (6G) technology that is a future wireless communication system. Among the candidates, terahertz (THz) band wireless communication is being selected as influential technology. THz communication refers to communication in the band of 0.1 THz to 10 THz and a very high information transfer rate may be expected using a wide bandwidth. Here, THz communication has characteristics of being very weak in signal strength and being significantly vulnerable even to blockage due to high propagation attenuation and molecular absorption according to a frequency. As described above, THz communication has various advantages and disadvantages and is currently in an early stage of research in the academic world.

To consider THz communication, both THz propagation characteristics and hardware characteristics need to be considered. The propagation characteristics of THz communication include weak signal strength and blockage. In terms of the hardware characteristics, since equipment that implements a THz signal has very low energy efficiency, output signal strength is very low. Therefore, a current THz communication system may not be readily used for long-distance communication. If securing line-of-sight (LoS) fails, communication becomes difficult. Accordingly, THz communication may be expected to have coverage as a big vulnerability.

Reference material is as follows: Y. Mao, B. Clerckx, J. Zhang, V. O. K. Li and M. A. Arafah, “Max-Min Fairness of K-User Cooperative Rate-Splitting in MISO Broadcast Channel With User Relaying,” in IEEE Transactions on Wireless Communications, vol. 19, no. 10, pp. 6362-6376, October 2020.

SUMMARY

Example embodiments describe a coverage extension method and apparatus in a terahertz (THz) region using cooperative communication and more particularly, provide technology that may extend coverage in a THz region using a cooperative communication technique based on rate-splitting multiple access (RSMA).

Example embodiments provide a new cooperative communication structure called extraction-based cooperative rate splitting (eCRS) to increase coverage and provide a coverage extension method and apparatus in a THz region using cooperative communication that may support electronic devices for which data supporting is absent using cooperative communication by designing and solving an issue based on the new cooperative communication structure and thereby increasing coverage.

According to an example embodiment, there is provided a coverage extension method in a THz region using cooperative communication performed by a computer device, the coverage extension method including setting, by an access point (AP) in a downlink system that supports a plurality of user equipments (UEs), a UE that requires assistance due to a blocked line-of-sight (LoS) link as a destination UE and setting a remaining UE as a medium UE among the plurality of UEs; transmitting, by the AP, data to the medium UE; and cooperatively transmitting, by the medium UE, data to the destination UE.

The transmitting of the data to the medium UE may include transmitting, by the AP, data requested by the destination UE and data requested by the medium UE to the medium UE.

The transmitting of the data to the medium UE may include splitting, by the AP, data requested by the medium UE into private data and a portion of common data; generating, by the AP, common data that includes information of the plurality of UEs by combining portions of the split common data of the medium UEs; encoding, by the AP, the private data to a private stream and encoding the common data to a common stream; and precoding, by the AP, the private stream and the common stream and transmitting a signal to the medium UE.

The transmitting of the data to the destination UE may include decoding, by the medium UE, the common stream; removing, by the medium UE, the common stream and then decoding the private stream that includes its own information; encoding, by each of the medium UEs, data requested by the destination UE to a data stream; and precoding, by the medium UE, the data stream and transmitting a signal to the destination UE.

The transmitting of the data to the medium UE may include splitting, by the AP, data requested by the medium UE without splitting data requested by the destination UE and transmitting the same signal to all the medium UEs based on the data requested by the destination UE and the data requested by the medium UE.

The transmitting of the data to the medium UE may include splitting, by the AP, data requested by the destination UE and data requested by the medium UE and transmitting different signals to all the medium UEs based on the data requested by the destination UE and the data requested by the medium UE.

The transmitting of the data to the destination UE may include splitting a channel using orthogonal frequency division multiplexing (OFDM) to correspond to the channel.

The transmitting of the data to the destination UE may include having a form of a multiple access channel.

According to another example embodiment, there is provided a coverage extension apparatus in a THz region using cooperative communication, the coverage extension apparatus including a setter configured to set, in a downlink system that supports a plurality of user UEs, a UE that requires assistance due to a blocked LoS link as a destination UE and to set a remaining UE as a medium UE among the plurality of UEs; and a transmitter configured to transmit data to the medium UE. The medium UE is configured to cooperatively transmit data to the destination UE.

The transmitter may be configured to transmit data requested by the destination UE and data requested by the medium UE to the medium UE.

The transmitter may include a data splitter configured to split data requested by the medium UE into private data and a portion of common data; a common data combiner configured to generate common data that includes information of the plurality of UEs by combining portions of the split common data of the medium UEs; an encoder configured to encode the private data to a private stream and to encode the common data to a common stream; and a precoder configured to precode the private stream and the common stream and to transmit a signal to the medium UE.

The medium UE may include a decoder configured to decode the common stream and to remove the common stream and then decode the private stream that includes its own information; an encoder configured to encode data requested by the destination UE to a data stream; and a precoder configured to precode the data stream and to transmit a signal to the destination UE.

The transmitter may be configured to split data requested by the medium UE without splitting data requested by the destination UE and to transmit the same signal to all the medium UEs based on the data requested by the destination UE and the data requested by the medium UE.

The transmitter may be configured to split data requested by the destination UE and data requested by the medium UE and to transmit different signals to all the medium UEs based on the data requested by the destination UE and the data requested by the medium UE.

According to still another example embodiment, there is provided a coverage extension apparatus in a THz region using cooperative communication, the coverage extension apparatus including an AP configured to set, in a downlink system that supports a plurality of UEs, a UE that requires assistance due to a blocked LoS link as a destination UE and to set a remaining UE as a medium UE among the plurality of UEs and then to transmit data to the medium UE; and the medium UE configured to cooperatively transmit data to the destination UE based on data received from the AP.

The AP may be configured to transmit data requested by the destination UE and data requested by the medium UE to the medium UE.

The AP may include a data splitter configured to split data requested by the medium UE into private data and a portion of common data; a common data combiner configured to generate common data that includes information of the plurality of UEs by combining portions of the split common data of the medium UEs; an encoder configured to encode the private data to a private stream and to encode the common data to a common stream; and a precoder configured to precode the private stream and the common stream and to transmit a signal to the medium UE.

The medium UE may include a decoder configured to decode the common stream and to remove the common stream and then decode the private stream that includes its own information; an encoder configured to encode data requested by the destination UE to a data stream; and a precoder configured to precode the data stream and to transmit a signal to the destination UE.

The AP may be configured to split data requested by the medium UE without splitting data requested by the destination UE and to transmit the same signal to all the medium UEs based on the data requested by the destination UE and the data requested by the medium UE.

The AP may be configured to split data requested by the destination UE and data requested by the medium UE and to transmit different signals to all the medium UEs based on the data requested by the destination UE and the data requested by the medium UE.

According to example embodiments, it is possible to provide a coverage extension method and apparatus in a THz region using cooperative communication that may extend coverage in a THz region using a cooperative communication technique based on RSMA.

According to example embodiments, it is possible to provide a new cooperative communication structure called eCRS to increase coverage and to provide a coverage extension method and apparatus in a THz region using cooperative communication that may support electronic devices for which data supporting is absent using cooperative communication by designing and solving an issue based on the new cooperative communication structure and thereby increasing coverage.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 6 illustrates an achievable rate according to the number of medium user equipments (mUEs) according to an example embodiment;

DETAILED DESCRIPTION

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure. Also, the example embodiments are provided to fully explain the present disclosure to those skilled in the art. Shapes and sizes, etc., of components in drawings may be exaggerated for clarity of description.

Cooperative communication refers to a collective term for technology that allows an electronic device in an environment for which data supporting is difficult to receive data supporting through cooperation between electronic devices in addition to a base station when performing communication in the electronic device.

The example embodiment proposes a cooperative communication system to complement weakness of THz communication. In detail, provided is a cooperative communication structure called extraction-based cooperative rate splitting (eCRS) using the concept of rate-splitting multiple access (RSMA) and a problem may be designed and solved by using the eCRS structure to be suitable for a THz band. Here, although THz band communication is considered, the proposed eCRS structure refers to a technique that may be employed regardless of a frequency domain.

The proposed eCRS may include two cases, IeCRS and DeCRS. Example embodiments may represent a model capable of well representing a THz region and, based on this, may design and solve a problem related to cases of IeCRS and DeCRS, verifying that coverage increases. Here, although two cases, IeCRS and DeCRS, are intensively explored, eCRS that is the proposed cooperative communication structure may be a broad concept that may encompass many cooperative communication structures. According to example embodiments, through a new cooperative communication structure, it is possible to solve coverage problems that may emerge in a future environment, such as an Internet of things (IoT) environment.

Figure 1:
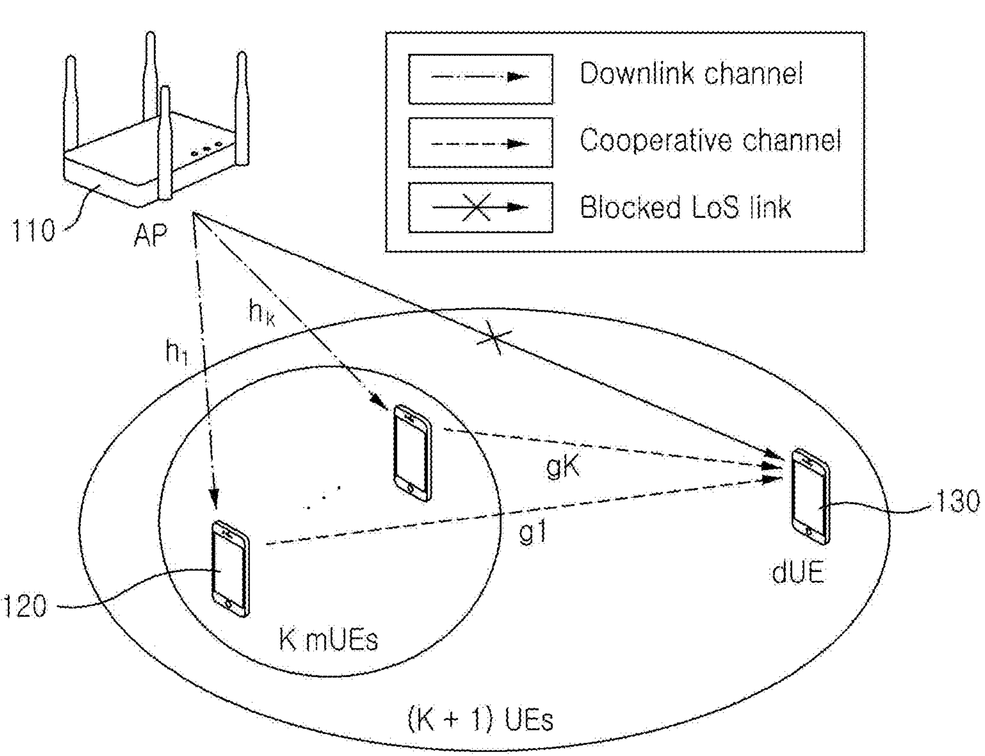
FIG. 1 illustrates a terahertz (THz) downlink system that operates through two phases according to an example embodiment.

FIG. 1 illustrates a terahertz (THz) downlink system that operates through two phases according to an example embodiment.

A communication system considered in the example embodiment refers to a multi-user downlink system. An access point (AP) 110 with N t antennas supports user equipments (UEs) (120 and 130) with (K+1) single antennas. Here, one UE that requires assistance due to a blocked line-of-sight (LoS) link is set as a destination UE (dUE) 130 and remaining K UEs are set as medium UEs (mUEs) 120 that perform cooperative communication. The mUEs 120 are expressed as a set $\mathcal{K}=\{1,2, \ldots, K\}$. The dUE 130 requests data $W_d$, and the k-th mUE 120 requests data $W_k$. Here, when data requested by the mUEs 120 is set to 0, it is equivalent to a multi-relay system. Therefore, a communication structure proposed in the example embodiment is a system that includes a relay system.

To support cooperative communication, the following example embodiment proposes a cooperative communication structure called an eCRS structure. The cooperative communication structure includes two stages in total. In a first stage, the AP 110 transmits the data $W_d$ and the data $W_k$ to the mUEs 120. In a second stage, the mUEs 120 cooperatively transmit the data $W_d$ to the dUE 130.

Referring to FIG. 1, the cooperative communication structure may be verified.

In the first phase, the AP 110 splits the data $W_d$ into $$\{W_d^{\mathcal{S}}\}_{\mathcal{S}\subset\mathcal{K}}, \mathcal{S} \neq \emptyset,$$

and splits the data $W_k$ into private data $W_{p,k}$ and $$\{W_{c,k}^{\mathcal{S}_i}\}_{\mathcal{S}_i\subset\mathcal{K}}, k \in \mathcal{S}_i.$$

Then, the AP 110 generates common data $$W_c^{\mathcal{S}}$$

by combining data with the same superscript $\mathcal{S}$. Here, the common data refers to data that includes information of a plurality of UEs, for example, the mUEs 120 and the dUE 130. The AP 110 encodes $W_{p,k}$ to private stream $s_k$ and encodes $$W_c^{\mathcal{S}}$$

to common stream $s_{c,\mathcal{S}}$. For example, if $\mathcal{S}=\{1,3\}$, $$W_c^{\{1,3\}}$$

includes $$W_{c,1}^{\{1,3\}}, W_{c,3}^{\{1,3\}}, W_d^{\{1,3\}}$$

and is encoded to $s_{c,\{1,3\}}$. Then, the k-th mUE 120 decodes the private stream $s_k$ that includes its own information and $s_{c,\mathcal{S}}$ that is $k\in \mathcal{S}$ among a plurality of common streams. Here, for the mUE 120 to decode a plurality of signals, a plurality of successive interference cancellation (SIC) layers is required. That is, (n−1) SIC layers are required to decode n signals.

The most general case of a communication structure proposed in the example embodiment is a structure that uses all common streams. In the example embodiment, the following is performed with the assumption that each of the mUEs 120 has a single SIC layer. If each mUE 120 has a single SIC layer, a single common stream may be decoded for each mUE 120 and a process of determining a common stream to be used is required. Here, to set all the mUEs 120 each to decode a single common stream, a mathematical decision process is performed as follows.

$$\cap\{\mathcal{S}_i\} = \emptyset, \bigcup\{\mathcal{S}_i\} = \mathcal{K}, \mathcal{S}_i \subset \mathcal{K}. \quad \text{[Equation 1]}$$

Here, $\mathcal{S}_i$ represents selecting common stream $s_{c,\mathcal{S}_i}$. Here, although various methos may be used to select common streams, an example embodiment describes that a total of two cases, a case in which $\{\mathcal{S}_1\}=\mathcal{K}$ that is called identical eCRS (IeCRS) and a case in which $$\{\mathcal{S}_i\}_{i=1}^{K} = \{\{1\}, \ldots, \{K\}\}$$

that is called distinct eCRS (DeCRS). Here, IeCRS refers to a case of transmitting the same signal to all the mUEs 120 and DeCRS refers to a case of transmitting different signals to all the mUEs 120.

IeCRS

Figure 2:
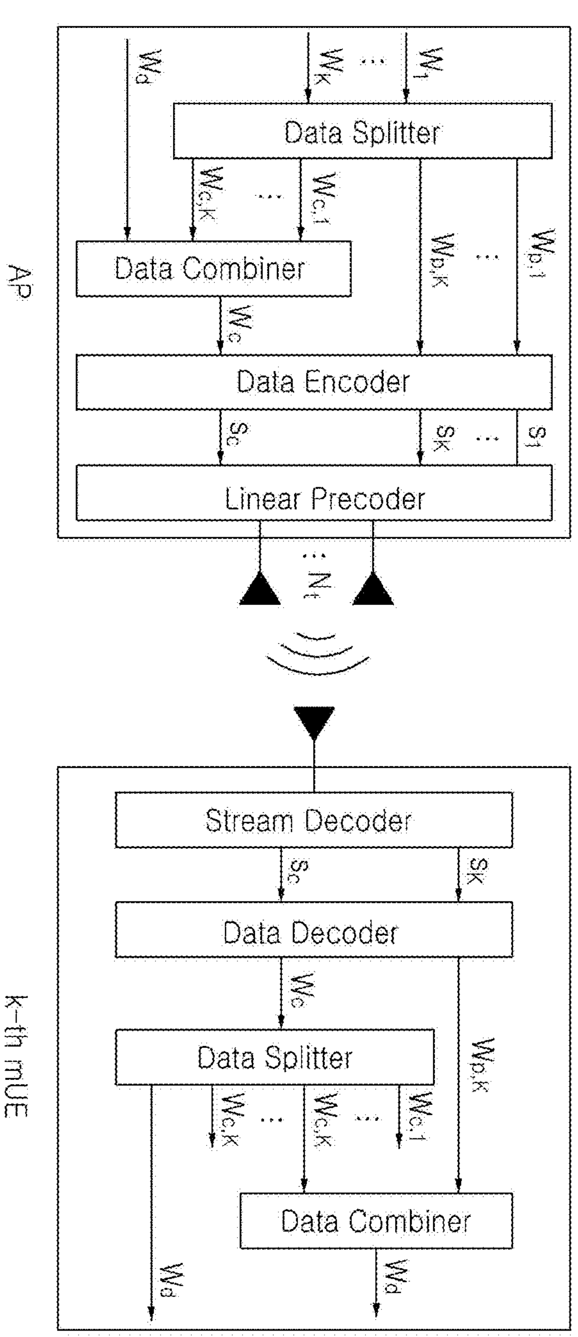
FIG. 2 illustrates a first phase of a cooperative communication structure of identical extraction-based cooperative rate splitting (IeCRS) according to an example embodiment.
Figure 3:
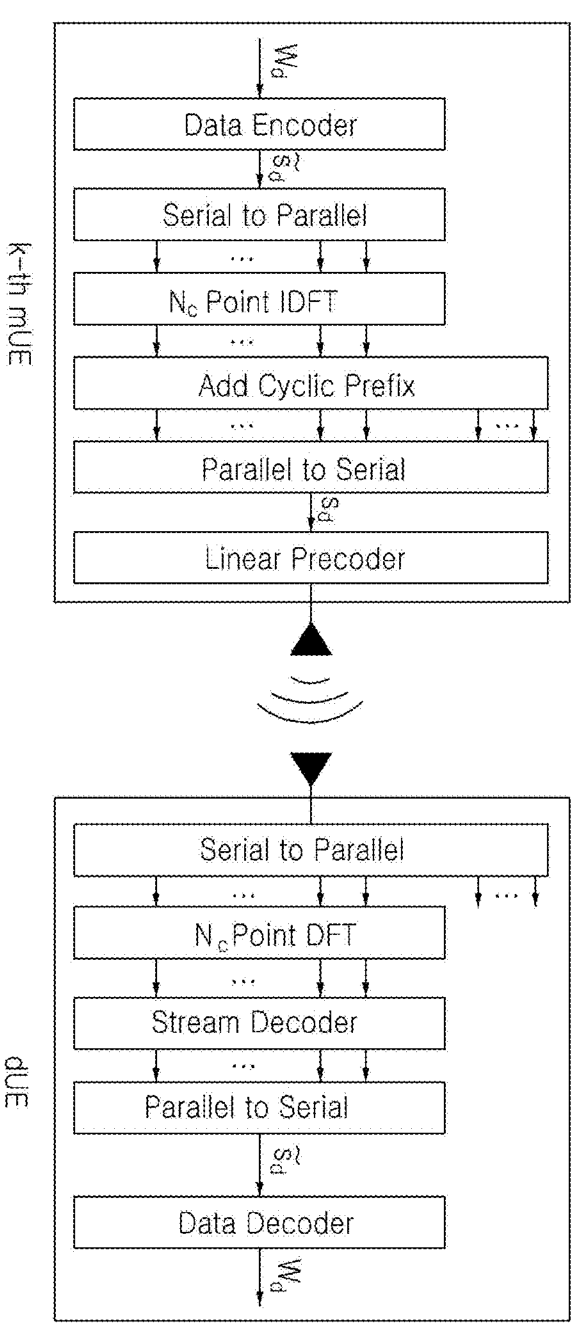
FIG. 3 illustrates a second phase of a cooperative communication structure of IeCRS according to an example embodiment.

FIG. 2 illustrates a first phase of a cooperative communication structure of IeCRS according to an example embodiment, and FIG. 3 illustrates a second phase of a cooperative communication structure of IeCRS according to an example embodiment.

In the case of IeCRS, a common stream is used as $\{\mathcal{S}_1\}=\mathcal{K}$. In this case, without splitting data $W_d$ for a dUE, data for a k-th mUE is split into $W_k=\{W_{p,k}, W_{c,k}\}$. In the case of IeCRS, since distinguishment is not difficult, subscript $\mathcal{K}$ in equation is omitted. Referring to FIG. 2, a data communication process that is the first phase of IeCRS may be verified. Then, common data is combined into $W_c=\{W_d, W_{c,1}, W_{c,K}\}$ and then $W_c$, $W_{p,k}$ are encoded to $s_c$, $s_k$, respectively. An AP precodes (K+1) streams and transmits a signal as follows.

$$x=\sum_{k=1}^{K} f_k s_k + f_c s_c. \qquad \text{[Equation 2]}$$

Here, $f_c$, $f_k$ are precoders for $s_c$, $s_k$, respectively.

Based on this, a received signal of the k-th mUE is expressed as follows.

$$y_k = h_k^H F s + z_k. \qquad \text{[Equation 3]}$$

Here, $h_k$ denotes a channel from the AP to the k-th mUE, F denotes a precoding matrix, s denotes a vector of streams, and $z_k$ denotes additive white Gaussian noise (AWGN).

After receiving a signal, the k-th mUE needs to decode $s_k$ that is a private stream and $s_c$ that is a common stream. The mUE may initially decode $s_c$, and an achievable rate thereof may be expressed as follows.

$$R_{c,k} = \log_2\left(1+\frac{|h_k^H f_c|^2}{|h_k^H f_k|^2 + I_k + 1}\right). \qquad \text{[Equation 4]}$$

Here, $$I_k = \sum\nolimits_{i \neq k} |h_k^H f_i|^2$$

represents interference of another signal. After removing the decoded $s_c$, a private stream may be acquired and an achievable rate thereof may be expressed as follows.

$$R_{p,k} = \log_2\left(1+\frac{|h_k^H f_k|^2}{I_k + 1}\right). \qquad \text{[Equation 5]}$$

Here, since all the mUEs need to decode a common stream, common data $W_c$ for all the mUEs need to satisfy an achievable rate condition as follows.

$$C_d + \sum_{i=1}^{K} C_i \le R_{c,k} \forall k \in \mathcal{K}. \qquad \text{[Equation 6]}$$

Here, $C_k$ denotes a rate for common part $W_{c,k}$ and $C_d$ denotes a rate for $W_d$. Then, the mUE acquires $W_{c,k}$ and $W_d$ from the common stream and acquires $W_k$ by combining $W_{c,k}$ and $W_{p,k}$. Expressing this as equation, an achievable rate for the k-th mUE is $R_k=R_{p,k}+C_k$.

In the second phase, all the mUEs transmit the same data $W_d$ to the dUE. Referring to FIG. 3, a data communication process that is the second phase of IeCRS may be verified. Each mUE encodes $W_d$ to data stream s d and then performs precoding and performs communication as follows.

$$x_{d,k} = f_{d,k} s_d. \qquad \text{[Equation 7]}$$

If transmission is performed as above, a signal received by the dUE at an m-th time is expressed as follows.

$$\begin{aligned} y_d[m] &= \sum_{k=1}^{K} g_k x_{d,k}[m-\tau_k] + z_d[m] \\ &= \sum_{k=1}^{K} \overline{g}_k s_d[m-\tau_k] + z_d[m]. \end{aligned} \qquad \text{[Equation 8]}$$

Here, $g_k$ and $\tau_k$ denote a channel value and a delay value between the k-th mUE and the dUE, respectively, $z_d$ denotes AWGN, and $\overline{g}_k=g_k f_{d,k}$ denotes a valid channel value that considers a precoder. In an example embodiment, a characteristic of a THz system is reflected and signals received through mUEs are modeled to have different delay values. This has a form of a frequency selective channel and a different communication strategy needs to be applied.

To correspond to a channel, in an example embodiment, the channel is split into $N_c$ sub-carriers using orthogonal frequency division multiplexing (OFDM). The channel to which OFDM is applied may be represented as follows.

$$\tilde{y} = \tilde{g}_n \tilde{s}_n + \tilde{z}_n. \qquad \text{[Equation 9]}$$

Here, $\tilde{s}_n$ denotes a transmission signal and $\tilde{z}_n$ denotes AWGN. A channel value may be represented according to OFDM, as follows.

$$\tilde{g}_n = \sum_{k=1}^{K} \overline{g}_k \exp\left(-\frac{j2\pi\tau_k n}{N_c}\right). \qquad \text{[Equation 10]}$$

If all data acquired from a total of $N_c$ sub-carriers is added, an achievable rate may be expressed as follows.

$$\begin{aligned} R_d^{(2)} &= \frac{1}{N_c + L}\sum_{n=1}^{N_c} \log_2\left(1+|\tilde{g}_n|^2\right) \\ &\approx \frac{1}{N_c}\sum_{n=1}^{N_c} \log_2\left(1+|\tilde{g}_n|^2\right). \end{aligned} \qquad \text{[Equation 11]}$$

Here, L denotes a length of a cyclic prefix and is sufficiently short compared to $N_c$ and cannot be ignored accordingly. Combining contents of the first phase and the second phase, an achievable rate of the dUE in IeCRS may be expressed as follows.

$$R_d = \min\{C_d, R_d^{(2)}\} \quad \text{[Equation 12]}$$

DeCRS

Figure 4:
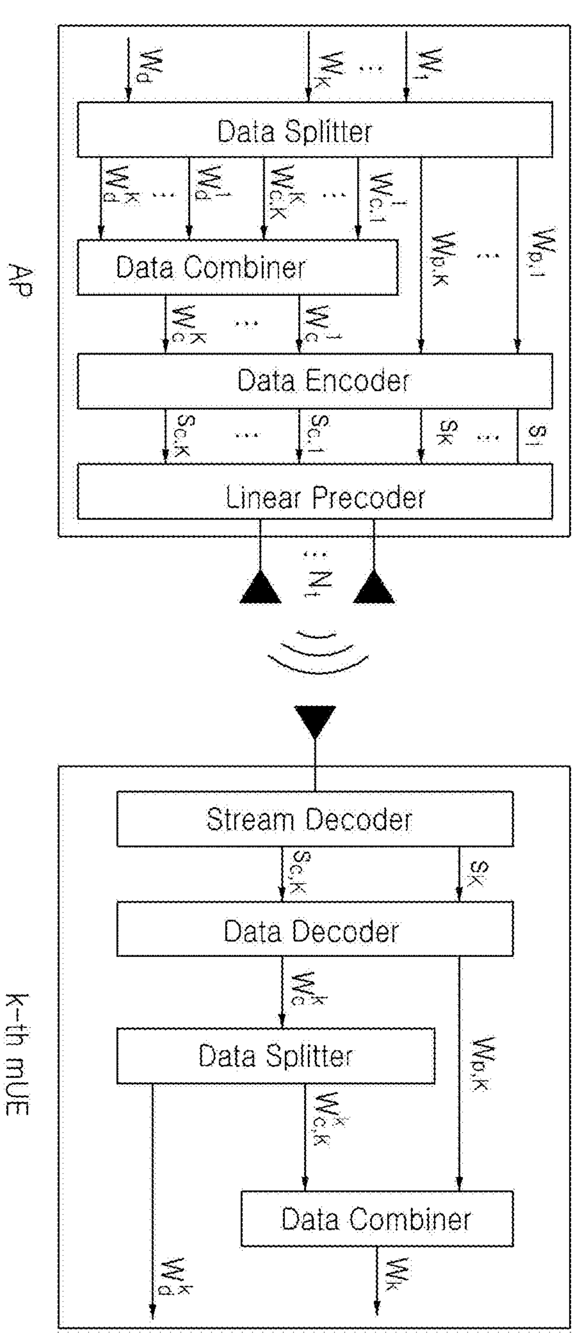
FIG. 4 illustrates a first phase of a cooperative communication structure of distinct eCRS (DeCRS) according to an example embodiment.
Figure 5:
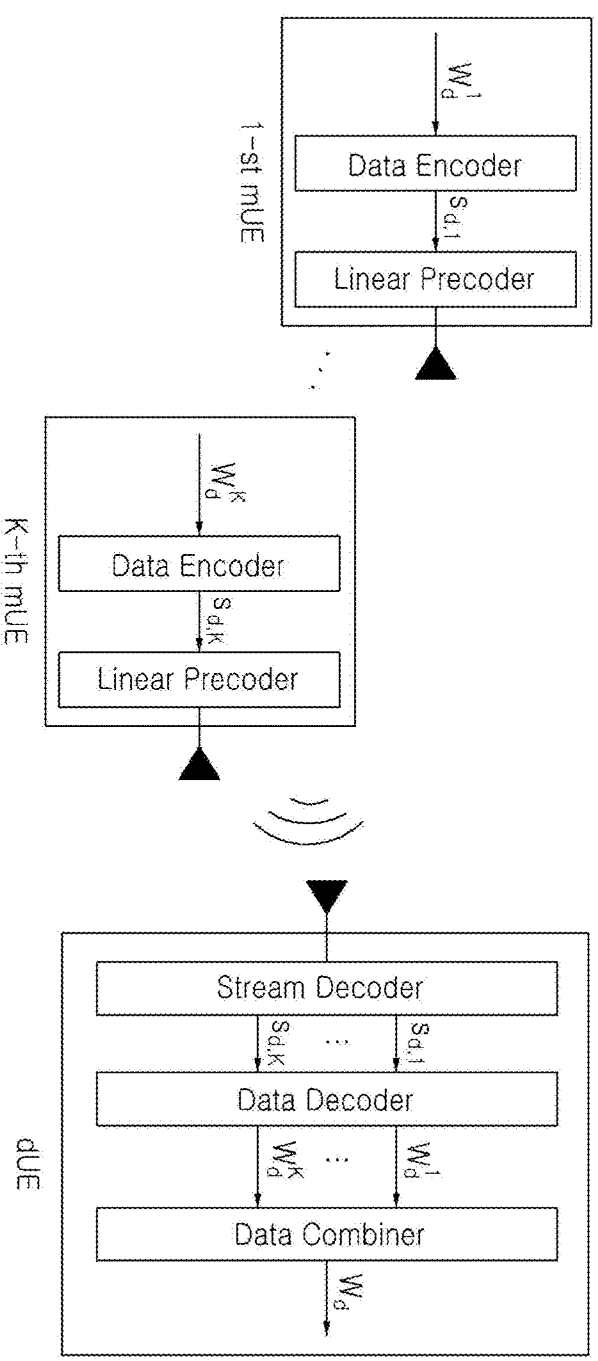
FIG. 5 illustrates a second phase of a cooperative communication structure of DeCRS according to an example embodiment.

FIG. 4 illustrates a first phase of a cooperative communication structure of DeCRS according to an example embodiment, and FIG. 5 illustrates a second phase of a cooperative communication structure of DeCRS according to an example embodiment.

DeCRS refers to a case in which $$\{S_i\}_{i=1}^{K} = \{\{1\}, \{2\}, \ldots, \{K\}\}$$

is selected as a common stream in the eCRS structure. Referring to FIG. 4, a data communication process that is the first phase of DeCRS may be verified. In DeCRS, K private streams and a common stream may be used and a transmission signal of an AP may be expressed as follows.

$$x = \sum_{k=1}^{K} f_{c,k} s_{c,k} + f_k s_k. \quad \text{[Equation 13]}$$

Here, $f_{c,k}$ and $f_k$ denote precoders for common stream $s_{c,k}$ and private stream $s_k$, respectively.

Based on this, a received signal of a k-th mUE may be represented as follows.

$$y_k = h_k^H F s + z_k. \quad \text{[Equation 14]}$$

Here, variables may be defined in the same manner as in IeCRS.

After receiving a signal, the k-th mUE needs to decode $s_k$ that is the private stream and $s_{c,k}$ that is the common stream. The mUE may initially decode $s_{c,k}$ and an achievable rate thereof may be expressed as follows.

$$R_{c,k} = \log_2\left(1 + \frac{|h_k^H f_{c,k}|^2}{|h_k^H f_k|^2 + I_k + I_{c,k} + 1}\right). \quad \text{[Equation 15]}$$

Here, each of $$I_k = \sum_{i \neq k} |h_k^H f_i|^2 \text{ and } I_{c,k} = \sum_{i \neq k} |h_k^H f_{c,i}|^2$$

represents interference of a different signal. After removing the decoded $s_{c,k}$, a private stream may be acquired and an achievable rate thereof may be represented as follows.

$$R_{p,k} = \log_2\left(1 + \frac{|h_k^H f_k|^2}{I_k + I_{c,k} + 1}\right). \quad \text{[Equation 16]}$$

Similar to the case of IeCRS, the following condition needs to be satisfied to successfully decode a common stream.

$$C_{d,k} + C_k \le R_{c,k} \forall k \in \mathcal{K}. \quad \text{[Equation 17]}$$

Here, $C_k$ denotes a rate for common part $$W_{c,k}^k$$

and $C_{d,k}$ denotes a rate for $$W_d^k.$$

Then, the mUE acquires $$W_{c,k}^k$$

and $$W_d^k$$

from the common stream and acquires $W_k$ by combining $$W_{c,k}^k$$

and $W_{p,k}$. Expressing this as equation, an achievable rate for the k-th mUE is $R_k = R_{p,k} C_k$.

In the second phase, the k-th mUE transmits $W_{d,k}$ to the dUE. Referring to FIG. 5, a data communication process that is the second phase of DeCRS may be verified. The k-th mUE encodes $$W_{d,k}^k$$

to data stream $s_{d,k}$ and then performs precoding and performs communication as follows.

$$x_{d,k} = f_{d,k} s_{d,k}. \quad \text{[Equation 18]}$$

If transmission is performed as above, a signal received by the dUE at an m-th time is expressed as follows.

[Equation 19]

$$y_d[m]=\sum_{k=1}^{K}g_k x_{d,k}[m-\tau_k]+z_d[m]=\sum_{k=1}^{K}\overline{g}_k s_{d,k}[m-\tau_k]+z_d[m].$$

While the case of IeCRS uses a form of a frequency selective channel in the second phase, DeCRS uses a form of a multiple access channel. With the assumption that all signals are simultaneously received, an achievable rate may be computed as follows.

$$R_d^{(2)}=\log_2\left(1+\frac{|\overline{g}_k|^2}{J_k+1}\right).\quad\text{[Equation 20]}$$

Here, $J_k=\Sigma_{i\neq k}|\overline{g}_i|^2$ denotes interference. Collecting this, an achievable rate of the dUE in DeCRS may be expressed as follows.

$$R_d=\sum_{k=1}^{K}\min\{C_{d,k},R_{d,k}^{(2)}\}.\quad\text{[Equation 21]}$$

Optimization Technique in IeCRS

The example embodiment maximizes minimum rate values (achievable rates) of mUEs and a dUE as a single implementation example. A problem may be solved based on other objectives.

The whole problem may be expressed as follows.

[Equation 22]

$$\max_{F,c,\overline{g}}\min\{R_1,\ldots,R_K,R_d\}\quad\text{(P1)}$$

$$\text{s.t. } R_k=R_{p,k}+C_k,\ \forall k\in\mathcal{K},\quad\text{(1a)}$$

$$C_d+\sum_{i=1}^{K}C_i\le R_{c,k},\ \forall k\in\mathcal{K},\quad\text{1b)}$$

$$R_d=\min\{C_d,R_d^{(2)}\},\quad\text{1c)}$$

$$tr(FF^H)\le P_{AP},\quad\text{1d)}$$

$$|\overline{g}_k|^2\le|g_k|^2P_k,\ \forall k\in\mathcal{K}.\quad\text{1e)}$$

Here, $P_{AP}$, $P_k$ denote maximum power values of an AP and a k-th mUE, respectively, and c and $\overline{g}$ are defined as $c=[C_1,\ldots,C_K,C_d]^T$ and $\overline{g}=[\overline{g}_1,\ldots,\overline{g}_K]^T$, respectively. (P1) does not have a form of a convex optimization technique and thus, is directly unsolvable. Therefore, after dividing the problem into a problem for the first phase and a problem for the second phase, a minimum value of rates acquired from the respective phases may be considered as a result.

The problem in the first phase may be expressed as follows.

[Equation 23]

$$\max_{F,c}\min\{R_1,\ldots,R_K,C_d\}\quad\text{(P2)}$$

-continued $$\text{s.t. }(1a),(1b),(1d).$$

Also, the problem in the second phase may be expressed as follows.

[Equation 24]

$$\max_{\overline{g}}R_d^{(2)}\quad\text{(P3)}$$

$$\text{s.t. }(1e).$$

Then, the problem in the first phase and the problem in the second phase may be transformed and solved using a weighted minimum mean square error (WMMSE) technique and a successive convex approximation (SCA) technique, respectively.

To use the WMMSE technique in the first phase, the following variables are defined.

[Equation 25]

$$\varepsilon_{c,k}=|w_{c,k}|^2T_{c,k}-2\text{Re}\{w_{c,k}h_k^Hf_c\}+1,$$

$$\varepsilon_{p,k}=|w_{p,k}|^2T_{p,k}-2\text{Re}\{w_{p,k}h_k^Hf_k\}+1,$$

$$\xi_{c,k}=\mu_{c,k}\varepsilon_{c,k}-\ln(\mu_{c,k}),$$

$$\xi_{p,k}=\mu_{p,k}\varepsilon_{p,k}-\ln(\mu_{p,k}).$$

Here, $$T_{c,k}=|h_k^Hf_c|^2+\sum_{i=1}^{K}|h_k^Hf_i|^2+1\text{ and }T_{p,k}=T_{c,k}-|h_k^Hf_c|^2.$$

Also, (P2) may generate the following problem through transformation.

[Equation 26]

$$\min_{\mathcal{V}_{IeCRS}}t_0\quad\text{(P2.1)}$$

$$\text{s.t. }X_k+\frac{(\xi_{p,k}-1)}{\ln 2}\le t_0,\ \forall k\in\mathcal{K},\quad\text{(2.1a)}$$

$$\frac{\xi_{c,k}-1}{\ln 2}\le X_d+\sum_{i=1}^{K}X_i,\ \forall k\in\mathcal{K},\quad\text{(2.1b)}$$

$$X_d\le t_0,\quad\text{(2.1c)}$$

$$(1d).$$

Here, $x=[X_1,\ldots,X_K]=-c$ and $t_0$ denotes a slack variable to expressmin$\{R_1,\ldots,R_K,C_d\}$. A set of variables is $\mathcal{V}_{IeCRS}=\{F,x,w,\mu,t_0\}$, and remaining variables are $w=[w_{p,1},\ldots,w_{p,K},w_{c,1},\ldots,w_{c,K}]$ and $\mu=[\mu_{p,1},\ldots,\mu_{p,K},\mu_{c,1},\ldots,\mu_{c,K}]$.

Here, if variables $\{w,\mu\}$ are fixed, (P2.1) may satisfy a form of an optimization problem with respect to $\{F,x,t_0\}$ and the problem may be solved using the optimization technique accordingly. Through this, with variables $\{F,x,t_0\}$ being fixed, variables $\{w,\mu\}$ may be updated with $$w_{c,k} = f_c^H h_k T_{c,k}^{-1},\ w_{p,k} = f_k^H h_k T_{p,k}^{-1},\ \mu_{c,k} = \varepsilon_{c,k}^{-1},\ \mu_{p,k} = \varepsilon_{p,k}^{-1},$$

and with variables {w, μ} being fixed, {F, x, $t_0$} may be updated using the optimization technique. By repeating this, a local optimum solution for the problem (P2) may be acquired.

In the second phase, (P3) may be generated into the following SCA technique problem through transformation.

[Equation 27]

$$\max_{\tilde{g},a,b,u} R_d^{(2)} = \frac{1}{N_c}\sum_{n=1}^{N_c}\log_2 1 + u_n\Big) \tag{P3.1}$$

$$s.t.\ u_n \le \tilde{a}_n^{(\ell)} + \tilde{b}_n^{(\ell)},\ \forall\, n \in \mathcal{N},$$

$$a = \mathrm{Re}\{\tilde{g}\},\ b = \mathrm{Im}(\tilde{g}),\ \forall\, n \in \mathcal{N},$$

$$(1e).$$

Here, $\tilde{g}=[\tilde{g}_1, \ldots, \tilde{g}_{N_c}]^T$ and $$\tilde{a}_n^{(\ell)}, \tilde{b}_n^{(\ell)}$$

is defined as follows.

[Equation 28]

$$\tilde{a}_n^{(\ell)} = \left(a_n^{(\ell)}\right)^2 + 2\left\{a_n^{(\ell)}\left(a_n - a_n^{(\ell)}\right)\right\},$$

$$\tilde{b}_n^{(l)} = \left(b_n^{(\ell)}\right)^2 + 2\left\{b_n^{(\ell)}\left(b_n - b_n^{(\ell)}\right)\right\}.$$

In addition, $a=[a_1, \ldots, a_{N_c}]^T$, $b=[b_1, \ldots, b_{N_c}]^T$, $u=[u_1, \ldots, u_{N_c}]^T$ are all slack variables, and $$a_n^{(\ell)}, b_n^{(\ell)}$$

denote local points in an $\ell$-th iteration. If problem (P3.1) is repeatedly solved using the optimization technique and $$a_n^{(\ell)}, b_n^{(\ell)}$$

are updated with an ($\ell-1$)-th solution, a local optimum solution for the problem (P3) may be acquired.

If a value $C_d$ of the first phase is acquired through (P2) and a value $$R_d^{(2)}$$

of the second phase is acquired through (P3), a final minimum rate value $R_d$ may be acquired using $$R_d = \min\{C_d, R_d^{(2)}\}.$$

An algorithm for IeCRS may be verified from the following Table 1.

Table 1 shows a minimum rate maximization algorithm in IeCRS.

TABLE 1

| Algorithm 1 Pseudo code for minimum rate maximization in IeCRS | |
|---|---|
| 1: | Initialization: Set $\ell_1 = 0$, $\mathbf{w}^{(\ell_1)}$, and $\boldsymbol{\mu}^{(\ell_1)}$. |
| 2: | repeat |
| 3: | Set $\ell_1 = \ell_1 + 1$. |
| 4: | Solve (P2.1) with fixed w and μ. |
| 5: | Update $\mathbf{w}^{(\ell_1)}$ and $\boldsymbol{\mu}^{(\ell_1)}$. |
| 6: | until $t_0$ decreases by a fraction below a predefined threshold. |
| 7: | $C_d = -t_0$. |
| 8: | Set $\ell_2 = 0$, $\mathbf{a}^{(\ell_2)}$, and $\mathbf{b}^{(\ell_2)}$. |
| 9: | repeat |
| 10: | Set $\ell_2 = \ell_2 + 1$. |
| 11: | Solve (P3.1). |
| 12: | Update the solution of (P3.2) as $\mathbf{a}^{(\ell_2)}$ and $\mathbf{b}^{(\ell_2)}$. |
| 13: | until $R_d^{(2)}$ increases by a fraction below a predefined threshold. |
| 14: | $R_d = \min\{C_d, R_d^{(2)}\}$. |

Low Complexity Technique in IeCRS

The example embodiment proposes a low complexity algorithm for acquiring a solution in a closed form in addition to a method using an optimization technique for a solution of the second phase in IeCRS.

Since devices operate with low power in THz band, $$R_d^{(2)}$$

may be approximated as follows by assuming a low signal-to-noise ratio (low SNR)

[Equation 29]

$$\sum_{n=1}^{N_c}\log_2\left(1 + |\tilde{g}_n|^2\right) \approx \sum_{n=1}^{N_c}\frac{|\tilde{g}_n|^2}{\ln(2)}.$$

Also, by modifying Equation 10, an OFDM channel may be expressed as $$\tilde{g}_n = \Omega_n^H \tilde{g}.$$

Here, $\Omega_n=[\Omega_{n,1}, \ldots, \Omega_{n,K}]^T$ and $$\Omega_{n,k} = \exp\left(\frac{j2\pi\tau_k n}{N_c}\right).$$

Using the modified form, $$R_d^{(2)}$$

may be simplified as follows.

[Equation 30]

$$\sum_{n=1}^{N_c} |\tilde{g}_n|^2 = \overline{g}^H \Omega \overline{g},\ \Omega = \sum_{n=1}^{N_c} \Omega_n \Omega_n^H.$$

Then, through mathematical derivation, if delay values of all mUEs are different, $\Omega = N_c I_K$ may be acquired and, through this, the problem of the second phase may be expressed as follows.

[Equation 31]

$$\max_{\overline{g}} \|\overline{g}\|^2$$

$$\text{s.t. } (1e).$$

Through this, it can be known that it is optimal for all mUEs to communicate with maximum power at the low SNR. Also, when there are mUEs having the same delay value, it can be easily derived in the similar manner as above that it is optimal for all the mUEs to communicate with the maximum power and optimal to adjust signals coming from the mUEs with the same delay to come in the same phase.

Optimization Technique Solution in DeCRS

The example embodiment maximizes a minimum rate value even in DeCRS, which is similar as in the case of IeCRS. If a problem is generated similar to the IeCRS problem, the problem may be represented as follows.

[Equation 32]

$$\max_{F,c,g} \min\{R_1, \ldots, R_K, R_d\} \quad \text{(P4)}$$

$$\text{s.t. } C_{d,k} + C_k \le R_{c,k},\ \forall k \in \mathcal{K}, \quad \text{(4a)}$$

$$R_d = \sum_{k=1}^{K} \min\{C_{d,k}, R_{d,k}^{(2)}\}, \quad \text{(4b)}$$

$$(1a), (1d), (1e).$$

$$\text{Here, } c = [C_1, \ldots, C_K, C_{d,1}, \ldots, C_{d,K}].$$

In the case of DeCRS, the problem may be solved at a time using a WMMSE technique without dividing the problem into two problems, which differs from the case of IeCRS. Transforming problem (P4) to be suitable for the WMMSE technique, the problem (P4) may be expressed as follows.

[Equation 33]

$$\min_{\mathcal{V}_{DeCRS}} t_0 \quad \text{(P4.1)}$$

$$\text{s.t. } X_k + \frac{(\xi_{p,k} - 1)}{\ln 2} \le t_0,\ \forall k \in \mathcal{K}, \quad \text{(4.1a)}$$

$$\frac{\xi_{c,k} - 1}{\ln 2} \le X_{d,k} + X_k,\ \forall k \in \mathcal{K}, \quad \text{(4.1b)}$$

$$X_{d,k} \le t_k, \quad \text{(4.1c)}$$

$$\frac{\xi_{d,k} - 1}{\ln 2} \le t_k,\ \forall k \in \mathcal{K}, \quad \text{(4.1d)}$$

$$\sum_{k=1}^{K} t_k \le t_0, \quad \text{(4.1e)}$$

-continued $$(1d), 1e).$$

Here, a set of variables is $\mathcal{V}_{DeCRS} = \{F, x, w, \mu, t, t_0\}$. Similar to the case of IeCRS, if this optimization problem is solved alternately using the WMMSE technique, a local optimum solution for (P4) may be acquired. An algorithm for DeCRS may be verified from the following Table 2.

Table 2 shows a minimum rate maximization algorithm in DeCRS.

TABLE 2

| Algorithm 2 Pseudo code for minimum rate maximization in DeCRS |
|---|
| 1: Initialization: Set $\ell = 0$, $w^{(\ell)}$, and $\boldsymbol{\mu}^{(\ell)}$. |
| 2: repeat |
| 3: Set $\ell = \ell + 1$. |
| 4: Solve (P4.1) with fixed w and μ. |
| 5: Update $w^{(\ell)}$ and $\boldsymbol{\mu}^{(\ell)}$. |
| 6: until $t_0$ decreases by a fraction below a predefined threshold. |
| 7: $R_d = -t_0$. |

Performance Comparison

Since a cooperative communication system disclosed in the example embodiment is absent in the related art, performance comparison is performed between proposed techniques. A case of using only the optimization technique in the case of IeCRS is referred to as IeCRS, a case of using the low complexity technique is referred to as LOW, and a case of using the optimization technique in the case of DeCRS is referred to as DeCRS. Also, IeCRS and DeCRS in a case in which the concept of common data is not used are referred to as identical extraction-based cooperative nonorthogonal multiple access (IeC-NOMA) and distinct extraction-based cooperative nonorthogonal multiple access (DeC-NOMA), respectively. Also, a case in which all the signals are simultaneously received while using IeCRS is referred to as single tap (ST).

Figure 6:
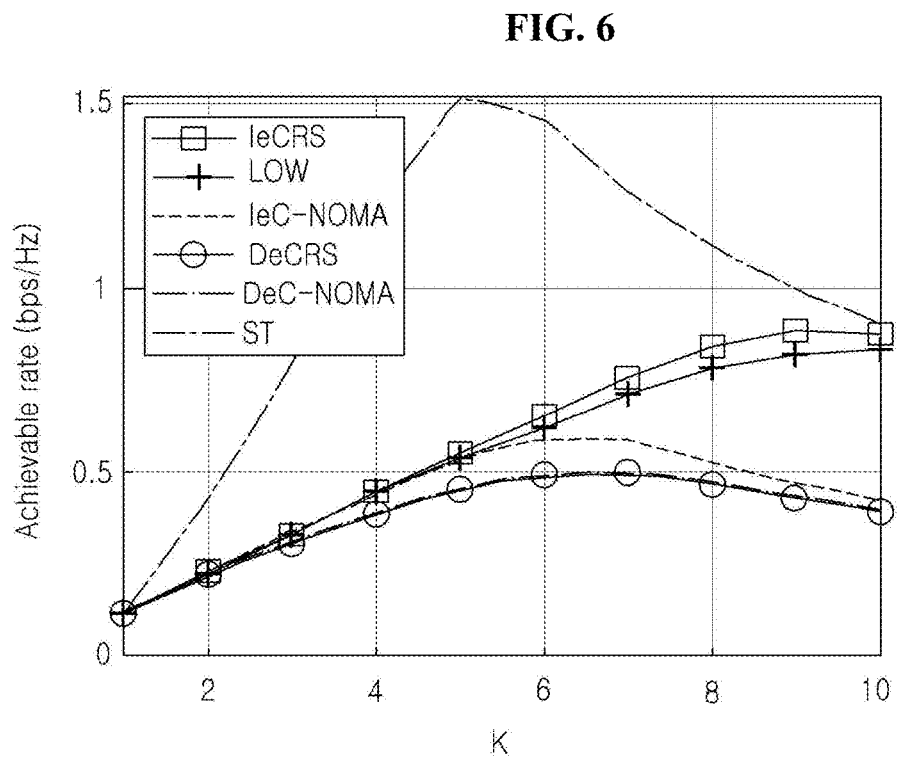

FIG. 6 illustrates an achievable rate according to the number of mUEs according to an example embodiment.

Referring to FIG. 6, achievable rates for the number of mUEs are compared. It can be seen from results that each technique has a point at which performance peaks. This is since the proposed structure includes two phases. In the second phase, since cooperation increases according to an increase in the number of mUEs, performance increases according to the increase in the number of mUEs. Conversely, in the first phase, since power of an AP is split more according to the increase in the number of mUEs, performance decreases. Therefore, if the number of mUEs is small, the performance in the second phase may be bottlenecked and as the number of mUEs increases, the performance may also increase. However, later, the performance in the first phase may be bottlenecked and as the number of mUEs increase, the performance may decrease. Also, overall, it can be seen that IeCRS has better performance than that of DeCRS and LOW has similar performance to that of IeCRS despite its low complexity. Also, it can be seen that IeC-NOMA and DeC-NOMA are special cases of IeCRS and DeCRS and have the same or degraded performance accordingly. Also, it can be seen that in the case of ST in which all the taps come at a time unrealistically, performance increases and in IeCRS, performance decreases due to fast sampling.

Figure 7:
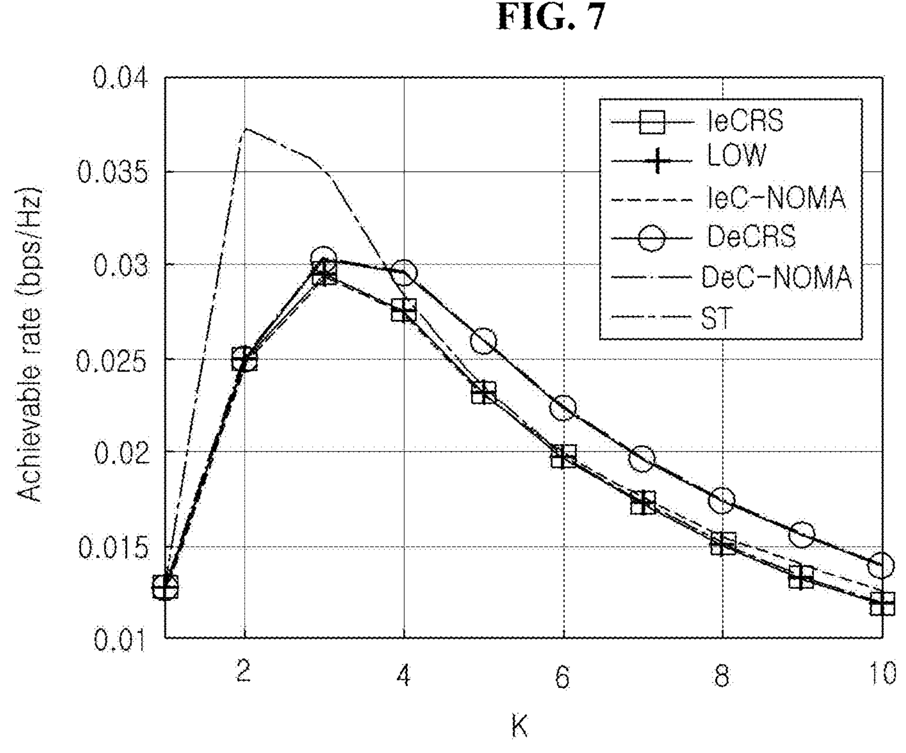
FIG. 7 illustrates an achievable rate according to the number of mUEs when power of an access point (AP) and mUEs is low according to an example embodiment.

FIG. 7 illustrates an achievable rate according to the number of mUEs when power of an AP and mUEs is low according to an example embodiment.

Referring to FIG. 7, achievable rates for the number of mUEs when power of an AP and mUEs is very low as −10 dBm are compared. Due to operation in two phases, each technique has a point at which performance peaks in the middle, which is the same as in FIG. 6. Here, contrary to FIG. 6, it can be seen that, when the number of mUEs is large, DeCRS has better performance than that of IeCRS. Since DeCRS transmits different signals to mUEs, cooperative communication may be performed by selecting specific mUEs when power is insufficient. Conversely, it can be seen that IeCRS has low power but communicates with all the mUEs and performance decreases accordingly. Through this, it can be seen that IeCRS and DeCRS have different advantages and both have excellent performance.

Figure 8:
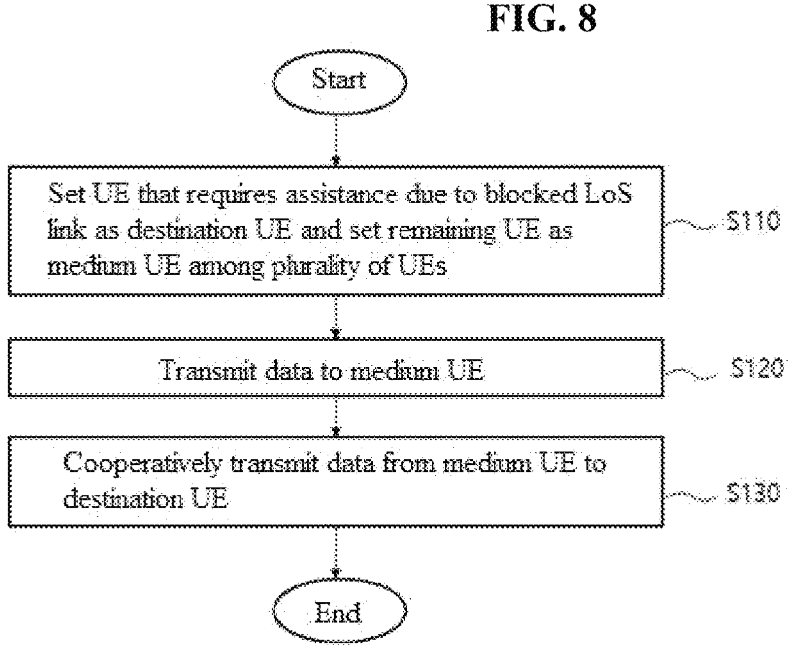
FIG. 8 is a flowchart illustrating a coverage extension method in a THz region using cooperative communication according to an example embodiment.

FIG. 8 is a flowchart illustrating a coverage extension method in a THz region using cooperative communication according to an example embodiment.

Referring to FIG. 8, a coverage extension method in a THz region using cooperative communication performed by a computer device according to an example embodiment may include operation S110 of setting, by an AP in a downlink system that supports a plurality of UEs, a UE that requires assistance due to a blocked LoS link as a destination UE and setting a remaining UE as a medium UE among the plurality of UEs, operation S120 of transmitting, by the AP, data to the medium UE, and operation S130 of cooperatively transmitting, by the medium UE, data to the destination UE.

Here, operation S120 of transmitting the data to the medium UE may include splitting, by the AP, data requested by the medium UE into private data and a portion of common data, generating, by the AP, common data that includes information of the plurality of UEs by combining portions of the split common data of the medium UEs, encoding, by the AP, the private data to a private stream and encoding the common data to a common stream, and precoding, by the AP, the private stream and the common stream and transmitting a signal to the medium UE.

Also, operation S130 of transmitting the data to the destination UE may include decoding, by the medium UE, the common stream, removing the common stream and then decoding the private stream that includes its own information, encoding, by each of the medium UEs, data requested by the destination UE to a data stream, and precoding, by the medium UE, the data stream and transmitting a signal to the destination UE.

Hereinafter, the coverage extension method in the THz region using the cooperative communication according to an example embodiment is further described.

The coverage extension method in the THz region using the cooperative communication according to an example embodiment may be further described using, as an example, a coverage extension apparatus in a THz region using cooperative communication according to an example embodiment.

Figure 9:
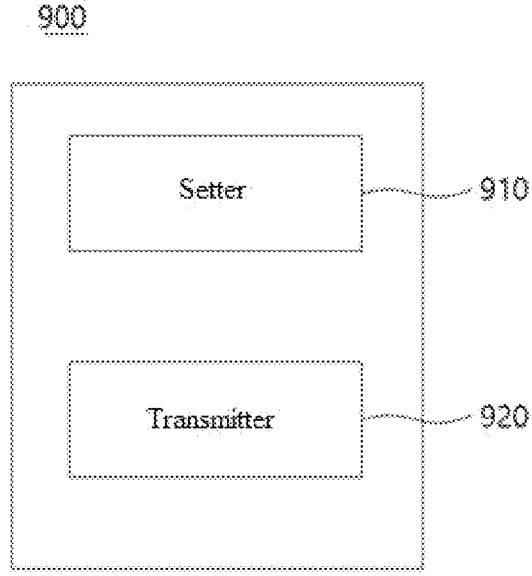
FIG. 9 is a diagram illustrating a coverage extension apparatus in a THz region using cooperative communication according to an example embodiment.

FIG. 9 is a diagram illustrating a coverage extension apparatus in a THz region using cooperative communication according to an example embodiment.

Referring to FIG. 9, a coverage extension apparatus 900 in a THz region using cooperative communication according to an example embodiment may include a setter 910 and a transmitter 920. Here, the coverage extension apparatus 900 in the THz region using cooperative communication according to an example embodiment may represent an AP or may include the AP.

In operation S110, in a downlink system that supports a plurality of UEs, the setter 910 of the AP may set a UE that requires assistance due to a blocked LoS link as a destination UE and may set a remaining UE as a medium UE among the plurality of UEs.

In operation S120, the transmitter 920 of the AP may transmit data to the medium UE. Therefore, the medium UE may cooperatively transmit data to the destination UE.

The transmitter 920 may transmit data requested by the destination UE and data requested by the medium UE to the medium UE. In detail, the transmitter 920 may include a data splitter configured to split data requested by the medium UE into private data and a portion of common data, a common data combiner configured to generate common data that includes information of the plurality of UEs by combining portions of the split common data of the medium UEs, an encoder configured to encode the private data to a private stream and to encode the common data to a common stream, and a precoder configured to precode the private stream and the common stream and to transmit a signal to the medium UE.

For example, in the case of IeCRS, the transmitter 920 may split data requested by the medium UE without splitting data requested by the destination UE and may transmit the same signal to all the medium UEs based on the data requested by the destination UE and the data requested by the medium UE.

As another example, in the case of DeCRS, the transmitter 920 may split data requested by the destination UE and data requested by the medium UE and may transmit different signals to all the medium UEs based on the data requested by the destination UE and the data requested by the medium UE.

Also, a coverage extension apparatus in a THz region using cooperative communication according to another example embodiment may include the AP 110 and the medium UE 120 as illustrated in FIG. 1. Also, depending on example embodiments, the coverage extension apparatus may further include the destination UE 130.

The coverage extension apparatus in the THz region using cooperative communication according to another example embodiment may include the AP 110 configured to set, in a downlink system that supports a plurality of UEs (120, 130), a UE that requires assistance due to a blocked LoS link as the destination UE 130 and to set a remaining UE as the medium UE 12 among the plurality of UEs (120, 130) and then to transmit data to the medium UE 120, and the medium UE 120 configured to cooperatively transmit data to the destination UE 130 based on data received from the AP 110.

The AP 110 may transmit data requested by the destination UE 130 and data requested by the medium UE 120 to the medium UE 120. In detail, the AP 110 may include a data splitter configured to split data requested by the medium UE 120 into private data and a portion of common data, a common data combiner configured to generate common data that includes information of the plurality of UEs by combining portions of the split common data of the medium UEs 120, an encoder configured to encode the private data to a private stream and to encode the common data to a common stream, and a precoder configured to precode the private stream and the common stream and to transmit a signal to the medium UE 120.

In the case of IeCRS, the AP 110 may split data requested by the medium UE 120 without splitting data requested by the destination UE 130 and may transmit the same signal to all the medium UEs 120 based on the data requested by the destination UE 130 and the data requested by the medium UE 120. Also, in the case of DeCRS, the AP 110 may split data requested by the destination UE 130 and data requested by the medium UE 120 and may transmit different signals to all the medium UEs 120 based on the data requested by the destination UE 130 and the data requested by the medium UE 120.

The medium UE 120 may include a decoder configured to decode the common stream and to remove the common stream and then decode the private stream that includes its own information, an encoder configured to encode data requested by the destination UE 130 to a data stream, and a precoder configured to precode the data stream and to transmit a signal to the destination UE 130.

In the case of IeCRS, to correspond to a channel, the medium UE 120 may divide the channel using OFDM. Also, in the case of DeCRS, the medium UE 120 may have a form of a multiple access channel.

As described above, example embodiments propose a cooperative communication system to compensate for limited coverage in consideration of disadvantages of THz band communication. To this end, the example embodiments propose a system model that specifically considers a THz band and also propose a new cooperative communication structure called an eCRS structure to support cooperative communication. Also, an optimization problem is designed and solved with respect to cases of IeCRS and DeCRS that are special two cases of the eCRS structure. Performance comparison shows that it is possible to successfully support a dUE out of coverage through the eCRS structure and it is verified that both IeCRS and DeCRS have excellent performance.

The apparatuses described herein may be implemented using hardware components, software components, and/or a combination of the hardware components and the software components. For example, the apparatuses and the components described herein may be implemented using one or more general-purpose or special purpose computers, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of the processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The program instructions stored in the media are specially designed and configured for the example embodiments and may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of the program instruction may include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A coverage extension method in a terahertz (THz) region using cooperative communication performed by a computer device, the coverage extension method comprising:

setting, by an access point (AP) in a downlink system that supports a plurality of user equipments (UEs), a UE that requires assistance due to a blocked line-of-sight (LoS) link as a destination UE and setting a remaining UE as a medium UE among the plurality of UEs;

transmitting, by the AP, data to the medium UE; and cooperatively transmitting, by the medium UE, data to the destination UE, wherein the transmitting of the data to the medium UE comprises:

splitting, by the AP, data requested by the medium UE into private data and a portion of common data;

generating, by the AP, common data that includes information of the plurality of UEs by combining portions of the split common data of the medium UEs;

encoding, by the AP, the private data to a private stream and encoding the common data to a common stream; and precoding, by the AP, the private stream and the common stream and transmitting a signal to the medium UE.

2. The coverage extension method of claim 1, wherein the transmitting of the data to the medium UE comprises transmitting, by the AP, data requested by the destination UE and data requested by the medium UE to the medium UE.

3. The coverage extension method of claim 1, wherein the transmitting of the data to the destination UE comprises:

decoding, by the medium UE, the common stream;

removing, by the medium UE, the common stream and then decoding the private stream that includes its own information;

encoding, by each of the medium UEs, data requested by the destination UE to a data stream; and precoding, by the medium UE, the data stream and transmitting a signal to the destination UE.

4. The coverage extension method of claim 1, wherein the transmitting of the data to the medium UE comprises:

splitting, by the AP, data requested by the medium UE without splitting data requested by the destination UE and transmitting the same signal to all the medium UEs based on the data requested by the destination UE and the data requested by the medium UE.

5. The coverage extension method of claim 1, wherein the transmitting of the data to the medium UE comprises:

splitting, by the AP, data requested by the destination UE and data requested by the medium UE and transmitting different signals to all the medium UEs based on the data requested by the destination UE and the data requested by the medium UE.

6. The coverage extension method of claim 1, wherein the transmitting of the data to the destination UE comprises splitting a channel using orthogonal frequency division multiplexing (OFDM) to correspond to the channel.

7. The coverage extension method of claim 1, wherein the transmitting of the data to the destination UE comprises having a form of a multiple access channel.

8. A coverage extension apparatus in a terahertz (THz) region using cooperative communication, the coverage extension apparatus comprising:

a setter configured to set, in a downlink system that supports a plurality of user equipments (UEs), a UE that requires assistance due to a blocked line-of-sight (LoS) link as a destination UE and to set a remaining UE as a medium UE among the plurality of UEs; and a transmitter configured to transmit data to the medium UE, wherein the medium UE is configured to cooperatively transmit data to the destination UE, and wherein the transmitter comprises:

a data splitter configured to split data requested by the medium UE into private data and a portion of common data;

a common data combiner configured to generate common data that includes information of the plurality of UEs by combining portions of the split common data of the medium UEs;

an encoder configured to encode the private data to a private stream and to encode the common data to a common stream; and a precoder configured to precode the private stream and the common stream and to transmit a signal to the medium UE.

9. The coverage extension apparatus of claim 8, wherein the transmitter is configured to transmit data requested by the destination UE and data requested by the medium UE to the medium UE.

10. The coverage extension apparatus of claim 8, wherein the medium UE comprises:

a decoder configured to decode the common stream and to remove the common stream and then decode the private stream that includes its own information;

an encoder configured to encode data requested by the destination UE to a data stream; and a precoder configured to precode the data stream and to transmit a signal to the destination UE.

11. The coverage extension apparatus of claim 8, wherein the transmitter is configured to split data requested by the medium UE without splitting data requested by the destination UE and to transmit the same signal to all the medium UEs based on the data requested by the destination UE and the data requested by the medium UE.

12. The coverage extension apparatus of claim 8, wherein the transmitter is configured to split data requested by the destination UE and data requested by the medium UE and to transmit different signals to all the medium UEs based on the data requested by the destination UE and the data requested by the medium UE.

13. A coverage extension apparatus in a terahertz (THz) region using cooperative communication, the coverage extension apparatus comprising:

an access point (AP) configured to set, in a downlink system that supports a plurality of user equipments (UEs), a UE that requires assistance due to a blocked line-of-sight (LoS) link as a destination UE and to set a remaining UE as a medium UE among the plurality of UEs and then to transmit data to the medium UE; and the medium UE configured to cooperatively transmit data to the destination UE based on data received from the AP, wherein the AP comprises:

a data splitter configured to split data requested by the medium UE into private data and a portion of common data;

a common data combiner configured to generate common data that includes information of the plurality of UEs by combining portions of the split common data of the medium UEs;

an encoder configured to encode the private data to a private stream and to encode the common data to a common stream; and a precoder configured to precode the private stream and the common stream and to transmit a signal to the medium UE.

14. The coverage extension apparatus of claim 13, wherein the AP is configured to transmit data requested by the destination UE and data requested by the medium UE to the medium UE.

15. The coverage extension apparatus of claim 13, wherein the medium UE comprises:

a decoder configured to decode the common stream and to remove the common stream and then decode the private stream that includes its own information;

an encoder configured to encode data requested by the destination UE to a data stream; and a precoder configured to precode the data stream and to transmit a signal to the destination UE.

16. The coverage extension apparatus of claim 13, wherein the AP is configured to split data requested by the medium UE without splitting data requested by the destination UE and to transmit the same signal to all the medium UEs based on the data requested by the destination UE and the data requested by the medium UE.

17. The coverage extension apparatus of claim 13, wherein the AP is configured to split data requested by the destination UE and data requested by the medium UE and to transmit different signals to all the medium UEs based on the data requested by the destination UE and the data requested by the medium UE.

* * * * *